United States Patent [19]

Schaller

[11] 4,274,181
[45] Jun. 23, 1981

[54] PIVOTAL AND RELEASABLE STRAP COUPLING

[76] Inventor: Helmut F. K. Schaller, Kuckucksweg 16, 8501 Feucht, Fed. Rep. of Germany

[21] Appl. No.: 64,888

[22] Filed: Aug. 8, 1979

[51] Int. Cl.³ .................... G10G 5/00; F16B 21/07
[52] U.S. Cl. ......................... 24/201 A; 24/211 L; 24/223; 24/230 R; 84/327; 224/257; 224/271; 403/316; 403/325; 403/331
[58] Field of Search ............ 24/201 A, 211 R, 211 L, 24/211 M, 223, 230 R, 230 AL, 230 BC; 224/257, 258, 264, 271, DIG. 900; 84/327; 403/316, 325, 327, 328, 331

[56] References Cited

U.S. PATENT DOCUMENTS

| 1,805,014 | 5/1931 | Schalk | 403/325 |
| 2,999,125 | 9/1961 | Young | 403/316 X |
| 3,237,977 | 3/1966 | Batchelder | 24/223 X |
| 3,631,572 | 1/1972 | Lange | 224/257 |
| 4,008,513 | 2/1977 | Griffiths | 24/201 A |
| 4,144,794 | 3/1979 | Silverman et al. | 224/257 X |

FOREIGN PATENT DOCUMENTS

| 1344915 | 10/1963 | France | 403/316 |
| 1350920 | 12/1963 | France | 403/327 |
| 7581 | of 1904 | United Kingdom | 24/230 R |
| 333405 | 8/1930 | United Kingdom | 403/325 |

Primary Examiner—Thomas J. Holko
Attorney, Agent, or Firm—McCormick, Paulding & Huber

[57] ABSTRACT

A coupling for connecting one end of a strap to a musical instrument or other body consists of a post fixed to the instrument and a catch fixed to the strap and cooperable with the post. The post has an enlarged head which is movable laterally into and out of a cavity in the catch. When the post head is received in the catch cavity a spring biased plunger of the catch enters a central opening of the post to prevent the catch and post from moving laterally out of assembly, while nevertheless permitting the catch and the associated strap to pivot or swivel relative to the post. The plunger is movable by hand out of the path of the post head during connection and disconnection of the post and catch relative to one another. Further, the two coupling parts can be quickly and easily connected and disconnected relative to one another with one hand of the user and without requiring extremely precise movements.

9 Claims, 7 Drawing Figures

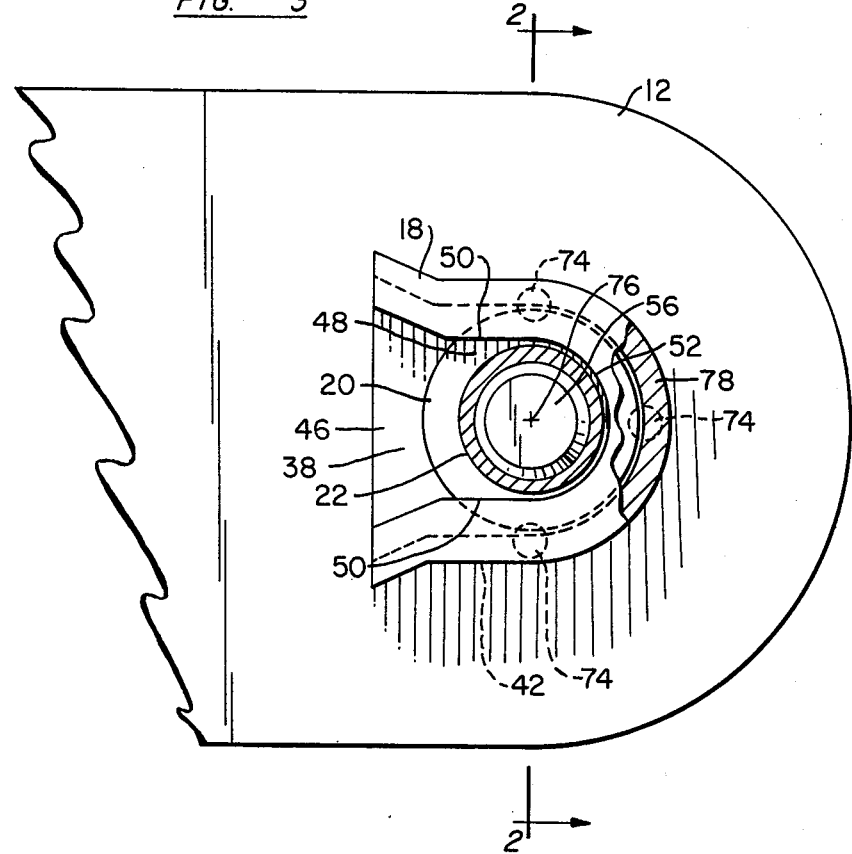
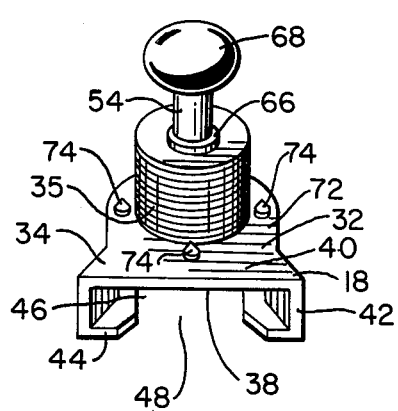
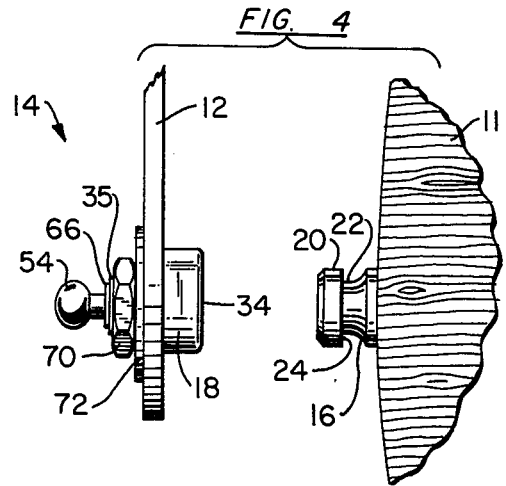

PIVOTAL AND RELEASABLE STRAP COUPLING

BACKGROUND OF THE INVENTION

This invention relates to a coupling for pivotally and releasably connecting one end of a strap to a musical instrument or other body, and deals more particularly with such a coupling consisting of cooperating parts adapted to be fixed to the body and to the strap, respectively.

In the case of a number of musical instruments, such as guitars, string basses, banjos, mandolins, marching drums and saxophones it is common practice to attach to the instrument a strap which passes around the neck or over the shoulder of the player to aid in holding the instrument in a playing position. But even when a strap is used, the performer generally wants a fair degree of freedom in moving the instrument relative to his body and, for this reason, it is generally preferred that the strap be connected to the instrument in such a way as to allow for pivotal or swivelling movement between the strap and the instrument. It is also usually preferred that the strap be capable of being easily and quickly connected and disconnected from the instrument so as to facilitate the performer's taking up and putting down of the instrument and of his switching from one instrument to another.

Various different couplings have been proposed in the past for pivotally and releasably connecting straps to musical instruments or to other bodies, but all of these have been subject to various disadvantages. The general object of this invention is, therefore, to provide an improved pivotal and releasable strap coupling.

In keeping with the general object, a more particular object of the invention is to provide a strap coupling having, in its connected condition, a very positive type of lock preventing inadvertent coming apart or disassembly of the coupling parts.

Another object of the invention is to provide a coupling which may be used with all types of musical instruments requiring straps and which may also be used for attaching straps to other types of bodies wherever a pivotal and releasable connection between a strap and body is required.

Another object of the invention is to provide a coupling of the foregoing character wherein the catch portion of the coupling may be so placed on the strap that during normal playing of the instrument the weight of the instrument urges the two parts of the coupling into engaged position and opposes disengagement of the two parts.

A still further object of the invention is to provide a coupling of the foregoing character wherein the catch part of the coupling has a wide opening or mouth for receiving the cooperating part of the coupling and for thereby easing the preciseness of the movement required to bring the two parts into connected relationship.

A further object of the invention is to provide a coupling wherein the catch which is mounted on the strap includes a means for inhibiting that part from rotating relative to the strap and for thereby causing it to hold its intended position.

A still further object of the invention is to provide a strap coupling of the type mentioned which provides for quick and easy connection and disconnection of a strap to and from a musical instrument or other body, which allows the parts of the coupling to be easily fitted to the strap and to the instrument, which reduces the likelihood of the strap mounted part of the coupling scratching or marring the instrument during connection and disconnection of the coupling, and which is quite strong yet relatively inexpensive to manufacture.

Other objects and advantages of the invention will be apparent from the following description of the preferred embodiment thereof and from the accompanying drawings.

SUMMARY OF THE INVENTION

This invention resides in a coupling for pivotally and releasably connecting one end of a strap to a musical instrument or other body with such coupling including a post adapted to be fixed to the instrument or other body and a catch adapted to be fixed to the strap. The post has a large diameter head and a smaller diameter neck below the head. The catch has a cavity and is designed so that the post and the catch may be moved into and out of assembly with one another by the head of the post being moved laterally into the cavity through a laterally opening mouth of the catch. A spring biased, manually operable and vertically slidable plunger in the catch extends into an opening extending into the post from the free end thereof and thereby holds the post and the catch in assembly by preventing lateral movement between the post and catch. By manual force, the plunger may be moved upwardly against the biasing force of the spring to move its lower end out of the path of the post head and to thereby allow the post and catch to be moved into and out of assembly.

The invention also resides in other details of the post and catch for achieving the objects referred to above.

BRIEF DESCRIPTION OF THE DRAWINGS

FIG. 3 is a sectional view taken on the line 3—3 of FIG. 2.

FIG. 4 is an enlarged elevational view of the left-hand coupling of FIG. 1 but with the two parts of the coupling being shown in their disassembled condition.

FIG. 7 is another perspective view of the catch of FIG. 2, this view being taken with the catch removed from the strap, with the washer and nut removed and looking toward the mouth and upper surface of the catch.

DETAILED DESCRIPTION OF THE PREFERRED EMBODIMENT

Figure 1:
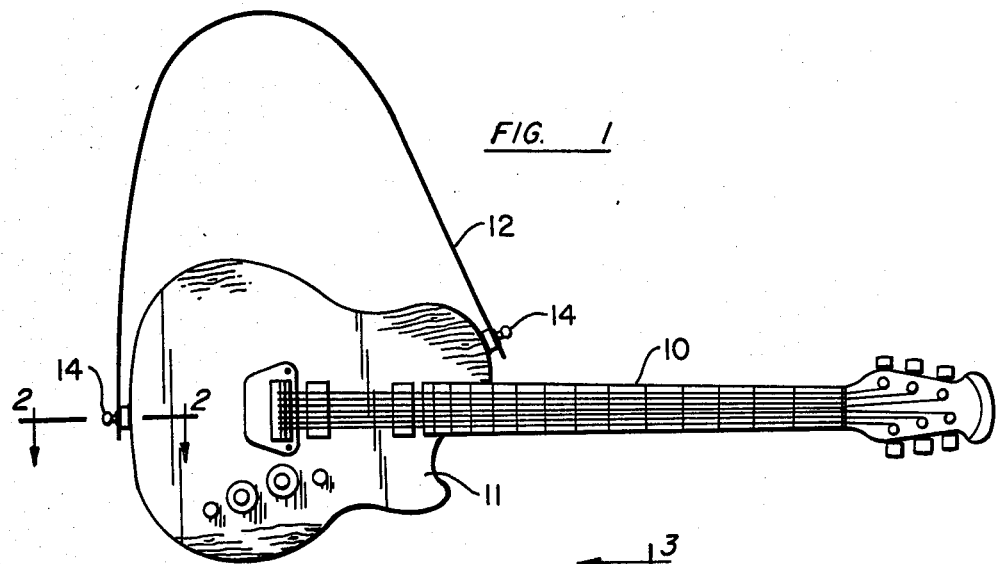
FIG. 1 is a plan view of a guitar having a strap connected to it by two identical couplings each embodying the present invention.

An application of a coupling embodying the present invention is shown in FIG. 1 wherein a guitar 10 with a body 11 is fitted with a strap 12 which is connected to the guitar body at each of its ends by two couplings 14, 14. These couplings allow the strap 12 to pivot freely relative to the body of the guitar and either one or both of the couplings may be quickly and easily manipulated to disconnect or connect one or both ends of the strap from or to the body. The two couplings are identical to one another and, for the purpose of discussion, the coupling shown in more detail in FIGS. 2 to 7 is taken to be the left-hand coupling 14 of FIG. 1.

Figure 2:
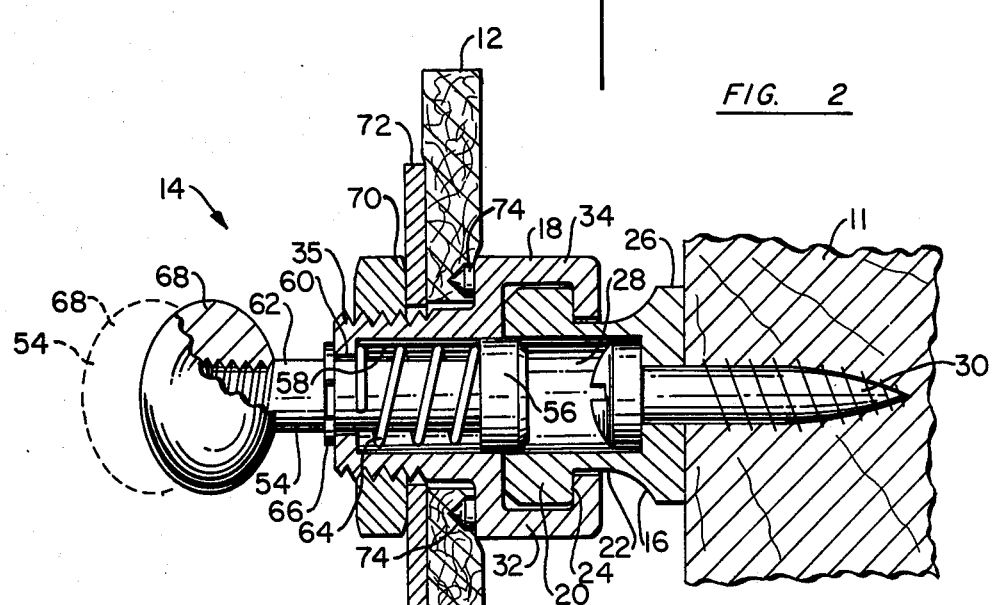
FIG. 2 is a longitudinal sectional view taken through the left-hand coupling of FIG. 1 and on the line 2—2 of FIG. 1 and FIG. 3.
Figure 5:
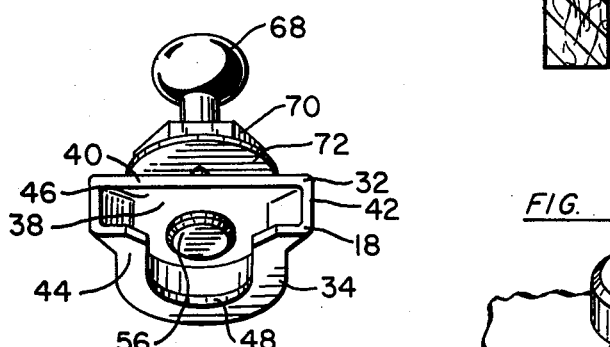
FIG. 5 is a perspective view of the catch of the coupling of FIG. 2, this view being taken with the catch removed from the strap and looking towards its mouth and bottom.
Figure 6:
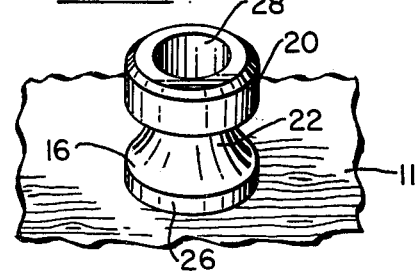
FIG. 6 is a perspective view of the post of the coupling of FIG. 2.

Referring to FIGS. 2 to 7, the coupling 14 consists basically of two parts, these being a body mounted part or post 16 and a strap mounted part or catch 18. The post 16, as best shown in FIGS. 2, 4 and 6, is a unitary member having a generally cylindrical head portion 20 at its upper or outer end which is followed immediately by a neck portion 22 of smaller diameter with the head portion and neck portion being separated from one another by a downwardly facing radial shoulder 24. Below the neck 22 is a large diameter base 26 which flatly engages the instrument body 15. Communicating with the upper or free end of the post is a cylindrical opening 28. A screw 30 having a head located in the opening 28 and a shank which passes through a smaller opening in the base 26 fixes the post to the body 11.

The catch 18 includes a catch body 32 having a receiver portion 34 and a vertical portion 35. The receiver portion 34 provides a receiver cavity 38 which is defined by a top wall 40, a sidewall 42 and a bottom wall 44. The sidewall 42 extends downwardly from the top wall 40 and extends for less than the full periphery along the edge of the top wall so as to provide, where absent, a laterally facing mouth 46 for the cavity 38. The bottom wall 44 has a slot 48 which extends inwardly from the mouth 46 and which is defined by a generally U-shaped edge having two generally parallel leg portions 50, 50 and an inner portion 52 connecting the two leg portions 50, 50, as shown in FIG. 3.

The cavity 38 is of such a size as to accommodate the head portion 20 of the post 22 with such head portion being movable into and out of the cavity through the mouth 46 with the neck portion 22 of the post at the same time extending through and moving along the slot 48. For this reason, the two parallel portions 50, 50 of the slot defining edge are spaced from one another by a distance which is only slightly greater than the diameter of the post neck portion 22 but which is less than the diameter of the head portion 20. Also, the sidewall 42 has two generally parallel portions corresponding to the parallel portions 50, 50 of the slot defining edge, and these two sidewall portions are preferably flared outwardly adjacent the mouth 46, as shown, as are also the parallel edge portions 50, 50 adjacent the mouth 46, to provide the mouth with a width substantially greater than that of the head portion 20 to facilitate movement of the head portion into the mouth during a connecting operation.

The marginal portions of the bottom wall 44 adjacent the slot 48 engage the shoulder 24 on the post to prevent the post and catch from moving any way other than laterally and rotatively relative to one another. To hold the post and catch in a connected condition, the vertical portion 35 of the catch body carries a vertically movable plunger 54 which is spring biased to the lower limited position shown in FIG. 2 and which is manually movable by hand to an upper limited position indicated by the broken lines of FIG. 2. At its lower end, the plunger has a part 56 which, in the lower position of the plunger, is receivable in the opening 28 of the post. This locks the post to the catch to prevent these two parts from moving laterally relative to one another, but nevertheless, the two parts are free to move pivotally relative to one another about the common central axis of the plunger and post. When the plunger is moved manually to its upper position, the part 56 is moved out of the path of the post head 20 to allow the post to be moved freely into and out of the catch cavity.

The vertical part 35 has a lower bore 58 which slidably receives the plunger part 56 and a smaller diametered upper bore 60 which slidably engages the shank 62 of the plunger. A spring 64 for biasing the plunger to its lower limited position is received in the bore 58 and is compressed between the plunger part 56 and the shoulder between the bore 58 and bore 60. A snap-ring 66 carried by and axially fixed to the plunger shank is engageable with the top end of the vertical part 35 to define the lower limited position of the plunger. A knob 68 threaded onto the shank 62 provides a convenient means for grasping the plunger to move it from its lower to its upper position.

The vertical part 35 of the catch body is generally cylindrical in shape and the catch body is fixed to the strap 12 by the vertical part 35 being passed through an opening in the strap. The outer or upper end of the vertical part 35 is threaded and receives a nut 70 to clamp the strap 12 between it and the upper face 72 of the upper wall 40 of the receiver portion of the catch body, with a washer 72 preferably being used between the nut 70 and the strap 12. To inhibit rotation of the catch body relative to the strap, the body includes three pointed nibs 74, 74 which bite into the strap 12 to nonrotatably lock the catch body to the strap.

Referring to FIG. 3, it should be noted that the inner portion 52 of the edge defining the slot 48 in the bottom wall is preferably semicircular in shape with a radius approximately equal to the radius of the neck portion 22 of the post and with its center aligned with the axis 76 of the plunger. Likewise, the corresponding portion, indicated at 78 in FIG. 3, of the sidewall 42 is semicircular in shape with a radius approximately equal to that of the head portion 20 of the post and with its center also aligned with the plunger axis 76. Therefore, when the post is moved into the slot 38 until it engages either the sidewall portion 78 or the edge portion 52 it will be automatically aligned with the plunger so that when the plunger is released the part 56 will immediately and easily enter the post bore 28 to lock the post and the catch in their connected condition.

Also, the catch 18 is preferably attached to the strap 12 so that the cavity mouth 46 faces generally upwardly in the usual playing position of the strap and instrument. Therefore, the weight of the instrument will urge the post toward the lower end of the cavity 38 in the direction opposite to that required for disconnecting the strap from the instrument. Therefore, both the plunger and the force of gravity assure that the strap and instrument will stay in connected condition.

I claim:

1. A coupling for pivotally and releasably connecting one end of a strap to a musical instrument or other body, said coupling comprising a post adapted to be fixed to a body and a catch adapted to be fixed to a strap, said post having an upper free end, a generally circular head portion adjacent said free end, and a generally circular neck portion below and adjacent said head portion which neck portion is of a smaller diameter than said head portion and is separated from said head portion by a generally radially extending shoulder, said post also having an opening of generally circular cross-section extending axially downwardly from said upper free end, said post having a vertical central axis and said head portion, said neck portion and said opening of said post all being generally coaxial to one another about said central post axis, said catch including a body having a receiver portion and a vertical portion, said receiver portion having an upper horizontal wall, a sidewall extending downwardly from said upper wall, and a horizontal bottom wall extending inwardly from the lower end of said sidewall, said upper wall, said sidewall and said bottom wall defining a receiver portion cavity, said sidewall extending less than completely around the periphery of said upper wall so as to provide by its absence along a part of said periphery a laterally facing mouth for said cavity, said bottom wall having a slot therein communicating with said mouth and extending some distance inwardly from said mouth, said slot being defined in said bottom wall by a generally U-shaped edge having two generally parallel leg portions extending inwardly from said mouth and an inner portion connecting said two leg portions, the spacing between said leg portions of said slot edge being greater than the diameter of the head portion of said post, and said receiver being otherwise so sized that said head portion of said post is movable into and out of said cavity by being moved laterally of said receiver portion through said mouth with said neck portion of said post extending through and moving along said slot in said bottom wall, said upper wall of said receiver portion of said catch body having an upper face and said vertical portion of said catch body extending upwardly from said upper face, a plunger carried by said vertical portion of said catch body for vertical movement between lower and upper limited positions relative to said vertical portion, and a spring biasing said plunger to said lower position relative to said vertical portion, said plunger extending upwardly beyond said vertical portion and having an exposed upper part which may be grasped by a user to lift said plunger from said lower to said upper position, said plunger also having a lower part which lower part in said lower position of said plunger extends downwardly below said upper wall of said receiver portion of said catch body and is receivable in said opening of said post to hold said post and said catch in connected condition while nevertheless allowing said catch to pivot relative to said post about said central axis thereof, and said lower end portion of said plunger when said plunger is raised to its upper position being located above the path of said upper free end of said post as it is moved laterally into and out of said receiver cavity so that when said plunger is raised to said upper position said post may be moved laterally into and out of said receiver cavity.

2. A coupling for pivotally and releasably connecting one end of a strap to a musical instrument or other body as defined in claim 1 further characterized by said vertical portion of said catch body being adapted to pass through an opening in a strap, and said vertical portion also being threaded adjacent its upper end to receive a nut for clamping a strap through which said vertical portion passes between such nut and said upper face of said upper wall of said receiver portion.

3. A coupling for pivotally and releasably connecting one end of a strap to a musical instrument or other body as defined in claim 2 further characterized by said catch body including at least one pointed nib extending upwardly from said upper face of said upper wall of said receiver portion to engage the strap with which said catch is used and to thereby inhibit rotation of said catch relative to said strap.

4. A coupling for pivotally and releasably connecting one end of a strap to a musical instrument or other body as defined in claim 1 further characterized by said inner portion of said U-shaped edge of said bottom wall of said receiver portion of said catch body being semicircular in shape with a radius approximately equal to the radius of said neck portion of said post, the center of said semicircular edge portion being aligned with the axis of said plunger.

5. A coupling for pivotally and releasably connecting one end of a strap to a musical instrument or other body as defined in claim 1 further characterized by said sidewall of said receiver portion of said catch body at the inner end of said cavity being generally semicircular in shape with a radius approximately equal to the radius of said head portion of said post, the center of said semicircular portion of said sidewall being aligned with the axis of said plunger.

6. A coupling for pivotally and releasably connecting one end of a strap to a musical instrument or other body as defined in claim 1 further characterized by said sidewall of said receiver portion of said catch body being generally U-shaped in horizontal section so as to have two generally parallel portions and, opposite from said mouth, a portion connecting said two parallel portions, said two generally parallel portions being spaced from one another by a distance slightly greater than the diameter of said head portion of said post.

7. A coupling for pivotally and releasably connecting one end of a strap to a musical instrument or other body as defined in claim 6 further characterized by said two generally parallel portions of said sidewall of said receiver portion of said catch body having outwardly flared portions on opposite sides of said mouth so as to provide said mouth with a horizontal dimension substantially greater than the diameter of said head portion of said post.

8. A coupling for pivotally and releasably connecting one end of a strap to a musical instrument or other body as defined in claim 1 further characterized by said vertical portion of said catch body having a lower cylindrical bore of one diameter and an upper cylindrical bore of a smaller diameter separated by a downwardly facing radial shoulder, said lower part of said plunger being received at least in part by said lower bore and being cylindrical and having a diameter approximately the same as that of said lower bore so as to be vertically slidable relative thereto, said plunger above said lower part thereof having a shaft portion of approximately the diameter of said upper bore and being slidably received by said upper bore, said spring surrounding said shaft portion of said plunger and being located between said lower part of said plunger and said shoulder between said lower and upper bores, and a radially outwardly extending fitting axially fixed to said shaft of said plunger above the upper end of said vertical portion of said catch body and engageable with said upper end of said vertical portion to restrict the downward movement of said plunger to said lower limit.

9. A coupling for pivotally and releasably connecting one end of a strap to a musical instrument or other body, said coupling comprising a post adapted to be fixed to a body and a catch adapted to be fixed to a strap, said post having an upper end with a generally circular head portion and also having a generally circular neck portion immediately below said head portion of smaller diameter than said head portion, said post also having an opening of generally circular cross section extending axially downwardly from its upper end, said catch having a cavity with a laterally facing mouth and a bottom wall defining the bottom of said cavity which bottom wall has a slot therein communicating with said mouth and extending some distance inwardly therefrom, said slot having a width slightly greater than the diameter of said post neck portion and less than the diameter of said post head portion, said head portion of said post being movable into and out of said cavity by being moved laterally of said catch through said mouth with said neck portion of said post extending through and moving along said slot in said bottom wall, a plunger carried by said catch body for vertical movement between lower and upper limited positions relative to said body, and a spring biasing said plunger to said lower limited position, said plunger extending upwardly beyond said catch body and having an exposed upper part which may be grasped by a user to lift said plunger from said lower to said upper position, said plunger also having a lower part which in said lower position of said plunger extends downwardly into said cavity and is receivable in said opening of said post to hold said post and said catch in connected condition while nevertheless allowing said catch to pivot relative to said post, and said lower end of said plunger when said plunger is raised to its upper position being located above the path of said post as it is moved laterally into and out of said cavity so that when said plunger is raised to said upper position said post may be moved laterally into and out of said cavity.

* * * * *